(12) United States Patent
Kawashima (10) Patent No.: US 7,889,248 B2
(45) Date of Patent: Feb. 15, 2011

(54) IMAGING APPARATUS AND METHOD OF PROCESSING IMAGE

(75) Inventor: Manabu Kawashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 11/982,998

(22) Filed: Nov. 6, 2007

(65) Prior Publication Data

US 2008/0111901 A1   May 15, 2008

(30) Foreign Application Priority Data

Nov. 9, 2006   (JP)   .................... P2006-303443

(51) Int. Cl.
*H04N 5/217*   (2006.01)
*H04N 5/228*   (2006.01)

(52) U.S. Cl. .................. 348/241; 348/208.99

(58) Field of Classification Search ............ 348/208.99, 348/208.1, 208.6, 208.13, 208.14, 208.15, 348/241, 229.1; 382/180, 275, 286
See application file for complete search history.

(56) References Cited

U.S. PATENT DOCUMENTS 7,512,286 B2 * 3/2009 Luo ........................ 382/286
7,623,712 B2 * 11/2009 Dai et al. .................. 382/180
7,659,923 B1 * 2/2010 Johnson .................. 348/218.1
2007/0086674 A1 * 4/2007 Guan ....................... 382/275

FOREIGN PATENT DOCUMENTS

JP   2000 50235   2/2000

* cited by examiner

*Primary Examiner*—Kelly L Jerabek
(74) *Attorney, Agent, or Firm*—Frommer Lawrence & Haug LLP; William S. Frommer

(57) ABSTRACT

An imaging apparatus for capturing an image using a solid-state imaging device. The imaging apparatus includes: a noise-elimination processing section capable of performing noise elimination processing on the captured image data by applying an individual noise-elimination intensity for each pixel; an image coding processing section compression coding the image data having been subjected to the noise-elimination processing; an image analyzing section analyzing the image data having been subjected to the noise-elimination processing and generating area specification information identifying a noticed area in the captured image; and a noise-elimination processing control section controlling the noise-elimination processing section so as to make the noise-elimination intensity for the noticed area in the captured image lower than the noise-elimination intensity for the other area on the basis of the area specification information from the image analyzing section.

11 Claims, 9 Drawing Sheets

IMAGING APPARATUS AND METHOD OF PROCESSING IMAGE

CROSS REFERENCES TO RELATED APPLICATIONS

The present invention contains subject matter related to Japanese Patent Application JP 2006-303443 filed in the Japanese Patent Office on Nov. 9, 2006, the entire contents of which are incorporated herein by reference.

BACKGROUND OF THE INVENTION

1. Field of the Invention

The present invention relates to an imaging apparatus capturing an image using a solid-state imaging device and a method of processing an image in the imaging apparatus. More particularly, the present invention relates to an imaging apparatus and a method of processing an image which reduce the amount of data of an output image and, at the same time, improve the image quality.

2. Description of the Related Art

For a monitoring camera system which constantly monitors images captured by a camera and analyzing the images in order to detect the occurrence of abnormality, larger scale systems have become possible to be built at low cost with increases in camera performance and IP (Internet Protocol) transmission support on captured images. In such a monitoring camera system, it becomes possible to monitor multiple points at the same time by a plurality of cameras provided in the system. However, this brings about an increase in the amount of image information to be recorded. Also, the image information flowing in a system through a network increases. Thus, it has become a major task to reduce the volume of recording and the volume of transmitting images without deteriorating the image quality.

For the volume of transmission of an image captured by an imaging apparatus, it is desirable to control the volume so as to transmit the image at a maximum volume not exceeding a certain upper limit in accordance with the band of the network of the monitoring camera system. Thus, there has been devised a monitoring apparatus in which a camera is internally provided with a function of detecting abnormality in a monitoring target area, and the volume of transmission of image information is controlled by increasing or decreasing the image compression level in a codec section in accordance with the detection of an abnormal state (for example, refer to Japanese Unexamined Patent Application Publication No. 2000-50235 (paragraph numbers [0039] to [0043], FIG. 1)).

Figure 9:
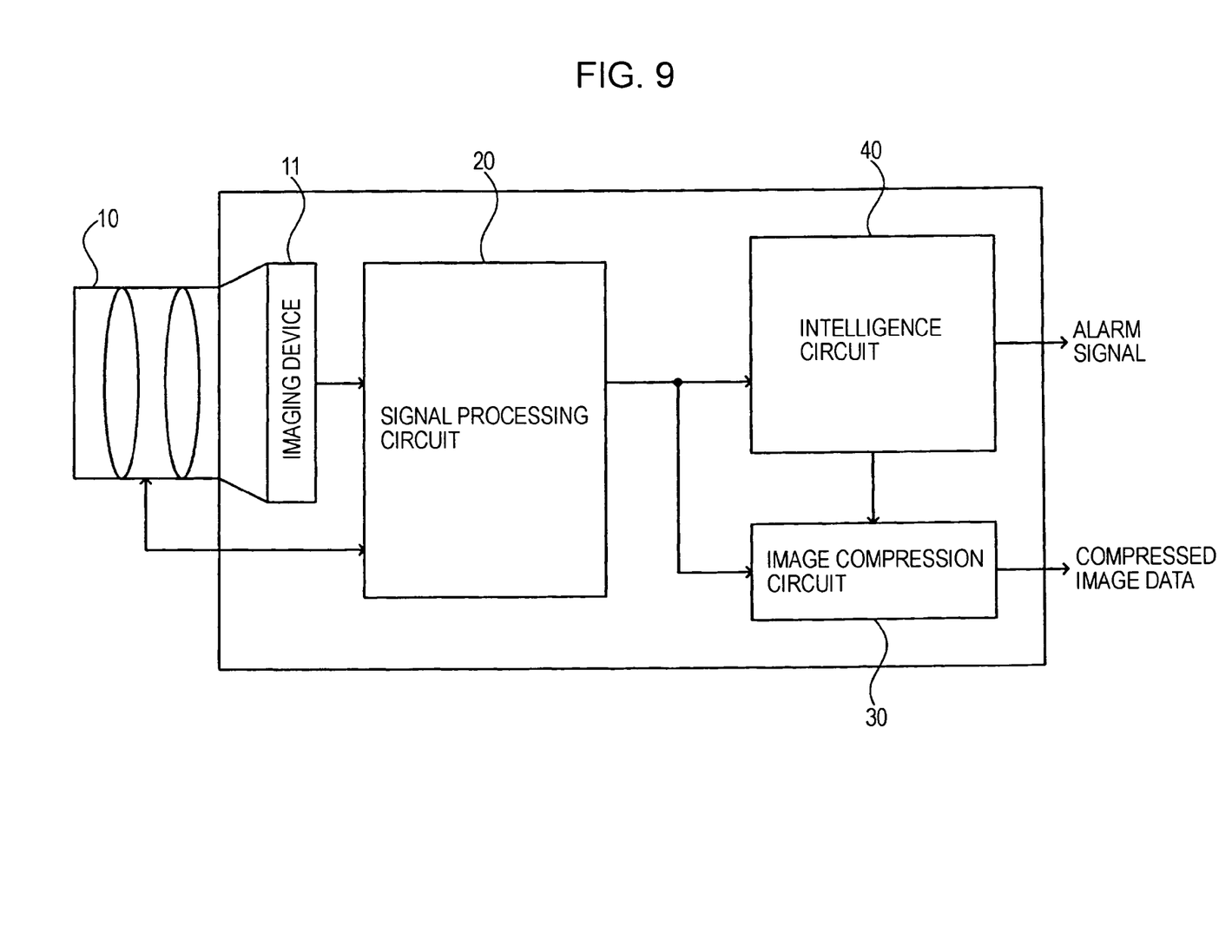
FIG. 9 is a functional block diagram illustrating a known IP monitoring camera.

FIG. 9 is a functional block diagram illustrating a known IP monitoring camera. The incident light on an optical block 10 provided with a camera lens, etc., is converted into an electrical signal by an imaging device 11, such as a CCD (Charge Coupled Device) or a CMOS (Complementary Metal Oxide Semiconductor) sensor, etc., and becomes digital image data through a signal processing circuit 20. In this regard, the optical block 10 is connected to the signal processing circuit 20, and thus the movement of the camera lens, etc., is controlled.

The image data from the signal processing circuit 20 is individually sent to an image compression circuit 30 for compressing the amount of data, and to an intelligence circuit 40 for detecting an abnormal state and a noticed area of a moving object, etc. The image compression circuit 30 delivers the compression-coded image data to a network. When detecting an abnormal state from the input image data, the intelligence circuit 40 outputs the result to the outside as an alarm signal.

In this case, if the image compression circuit 30 uniformly compresses the entire image, the image quality deteriorates seriously in the case of a narrow network band.

Thus, a captured image is divided into a plurality of screens by the signal processing circuit 20, and movement is detected for each of the divided images by the intelligence circuit 40. The image compression circuit 30 increases the compression rate on the divided images in which a movement has not been detected. Thus, it becomes possible to reduce the amount of data of the video data delivered from the image compression circuit 30, and to decrease the compression rate of the divided images in which movements have been detected to obtain high-quality image data. Accordingly, it becomes possible to maintain high image quality for important image parts while reducing the total amount of data, and to transmit the data on a network.

SUMMARY OF THE INVENTION

However, by the method of controlling the volume of image information by increasing and decreasing the image compression levels, it is not necessarily possible to remove only noise components. Thus, there has been a problem in that the S/N (Signal/Noise) ratio significantly deteriorates in areas having high compression levels. Also, there has been a problem in that complicated processing become necessary in order to increase or decrease the compression level for each area in one frame.

Also, in order to reduce the volume of recording image information from a camera, it is possible to think of a method in which the occurrence of an abnormal state is detected, and only the image information at that time is delivered without constantly recording the information. However, there has been a problem in that it is difficult to obtain sufficiently reliable detection result by the function of detecting abnormality in the current state.

The present invention has been made in view of these points. It is desirable to provide an imaging apparatus capable of restraining deterioration of an output image and reducing the amount of data of the output image, and a method of processing an image in the imaging apparatus.

According to an embodiment of the present invention, there is provided an imaging apparatus for capturing an image using a solid-state imaging device, the imaging apparatus including: a noise-elimination processing section capable of performing noise elimination processing on the captured image data by applying an individual noise-elimination intensity for each pixel; an image-coding processing section compression coding the image data having been subjected to the noise-elimination processing; an image analyzing section analyzing the image data having been subjected to the noise-elimination processing and generating area specification information identifying a noticed area in the captured image; and a noise-elimination processing control section controlling the noise-elimination processing section so as to make the noise-elimination intensity for the noticed area in the captured image lower than the noise-elimination intensity for the other area on the basis of the area specification information from the image analyzing section.

In such an imaging apparatus, the noise-elimination processing section receives the specification of the noise-elimination intensity from the noise-elimination processing control section, and performs the noise-elimination processing on the image data obtained by capturing an image. The image-coding processing section performs the compression coding of the image data having been subjected to the noise-elimination processing. The image analyzing section analyzes the image data having been subjected to the noise-elimination processing, and generates the area specification information identifying a noticed area in the captured image. The noise-elimination processing control section controls the noise-elimination processing section so as to make the noise-elimination intensity for the noticed area in the captured image lower than the noise-elimination intensity for the other area on the basis of the area specification information from the image analyzing section. Here, in the image areas having higher noise-elimination intensity, the high-frequency noise components of the image are smoothed, and the compression rate in the image-coding processing section is increased. In the image area having lower noise-elimination intensity, the image quality is relatively improved.

By the present invention, the control is performed such that for a noticed area in the captured image, the noise-elimination intensity is decreased to improve the image quality of the area, and for the areas other than the noticed area, the noise-elimination intensity is increased to reduce the amount of data after the compression coding. It is therefore possible to improve the image quality for an important area in the image while reducing the amount of image data to be output.

DESCRIPTION OF THE PREFERRED EMBODIMENTS

In the following, a detailed description will be given of an embodiment of the present invention by taking the case of applying the invention to a monitoring camera as an example with reference to the drawings.

First Embodiment

Figure 1:
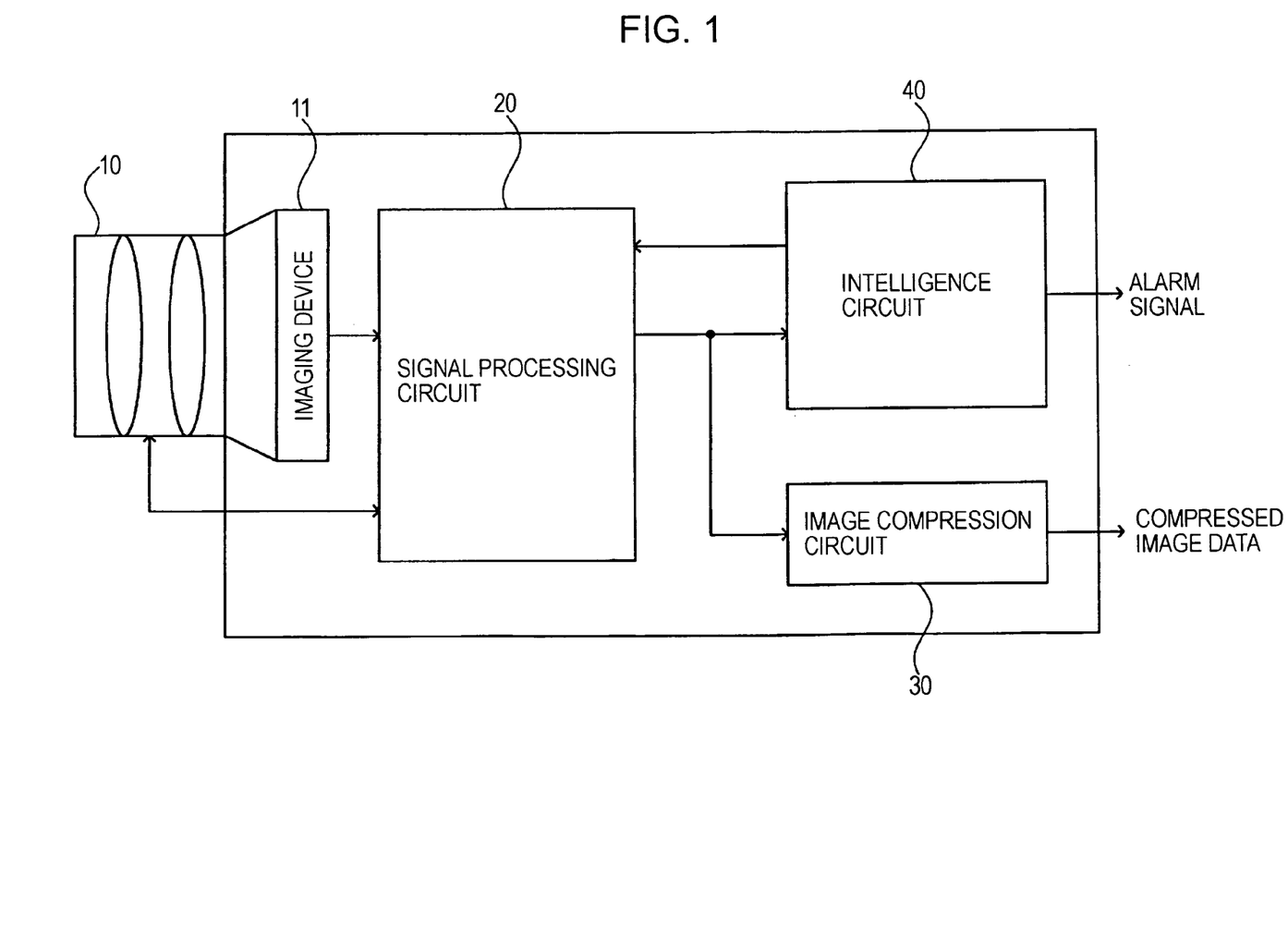
FIG. 1 is a block diagram illustrating the configuration of an imaging apparatus according to a first embodiment.

FIG. 1 is a block diagram illustrating the configuration of an imaging apparatus according to a first embodiment.

In an imaging apparatus shown in FIG. 1, an optical block 10 includes a camera lens, etc., and condenses the incident light from a predetermined monitoring area onto the light receiving surface of an imaging device 11. The imaging device 11 includes a CCD or a CMOS sensor, etc., converts the incident light from the optical block 10 into an electrical signal, and outputs the signal to the signal processing circuit 20. The signal processing circuit 20 converts the analog image signal output from the imaging device 11 into digital data, and further performs noise-elimination processing, etc., described below. Also, the signal processing circuit 20 can change a noise-elimination intensity for each pixel in one frame in accordance with the control signal from an intelligence circuit 40. In this regard, the optical block 10 is connected to the signal processing circuit 20, and thus the movement of the camera lens is controlled.

The image data from the signal processing circuit 20 is supplied to the image compression circuit 30 and the intelligence circuit 40. The image compression circuit 30 performs compression-coding processing on the digital image data from the signal processing circuit 20 in accordance with a predetermined image coding method, such as the MPEG (Moving Pictures Experts Group) method, etc., for example. The intelligence circuit 40 is image analyzing means for detecting an abnormal state from the image in a monitored area and detecting a noticed area of a moving object, etc. When an abnormal state is detected in the image data there, the intelligence circuit 40 outputs the result to the outside as an alarm signal. Also, the intelligence circuit 40 generates area specification information for identifying the detected noticed area, and feeds back the information to the signal processing circuit 20.

In this regard, the compressed image data from the image compression circuit 30 is recorded, for example on a recording medium not shown in the figure. Alternatively, the compressed image data is delivered to an external server apparatus through a network. Also, the alarm signal from the intelligence circuit 40 is, for example added to the compressed image data from the image compression circuit 30, and is also recorded onto the recording medium, or is delivered through the network.

The imaging apparatus according to the first embodiment is characterized by the point that area specification information on the noticed area of a moving object, etc., is fed back from the intelligence circuit 40 to the signal processing circuit 20. That is to say, when a moving object, a non-moving object, a man, a vehicle, or the like is detected in a monitored area of a monitoring camera by a monitor image, the intelligence circuit 40 disposed in the monitoring camera generates the area specification information on the noticed area. The signal processing circuit 20 distinguishes an important area from an unnoticed area by identifying the noticed area on the basis of the area specification information fed back. Accordingly, the signal processing circuit 20 differentiates the intensity (that is to say, the reduction level of noise components) of the noticed area from that of the other area, and performs the noise-elimination processing with proper intensity. Thereby, the compression rate in the image compression circuit 30 is increased, and thus it is possible to reduce the volume of the data output from the imaging apparatus onto a recording medium or a network.

In general, if a captured image contains a portion of a fine texture in the area other than a noticed area, such as the shaking of the leaves of a tree or sprays from waves, etc., for example, the compression efficiency of the image compression circuit 30 is not increased. However, it is possible to increase the compression efficiency of the image compression circuit 30 by performing the noise-elimination processing on the image data having many high-frequency components like this to eliminate the high-frequency noise components. Here, although the compression efficiency increases and the amount of data of the compressed image data can be reduced as the intensity of the noise-elimination processing increases, the deterioration of the image quality becomes noticeable. Thus, the intelligence circuit 40 correctly distinguishes a noticed area from the other areas, the intensity of the noise-elimination processing in the noticed area is decreased to improve the image quality, and the intensity of the noise-elimination processing in the other areas is relatively increased to improve the compression efficiency. Accordingly, it is possible to improve the image quality in an important image area in the image without increasing the amount of the compressed image data to be output.

By the imaging apparatus of the first embodiment described above, it is possible to reduce the amount of recording data of a monitoring camera system, and thereby to reduce the cost of the recording medium as a result. Also, it is possible to control and reduce the volume of transmission in a network transmission, and to continuously transmit images even in a monitoring camera system using a larger number of cameras as a result.

Second Embodiment

Figure 2:
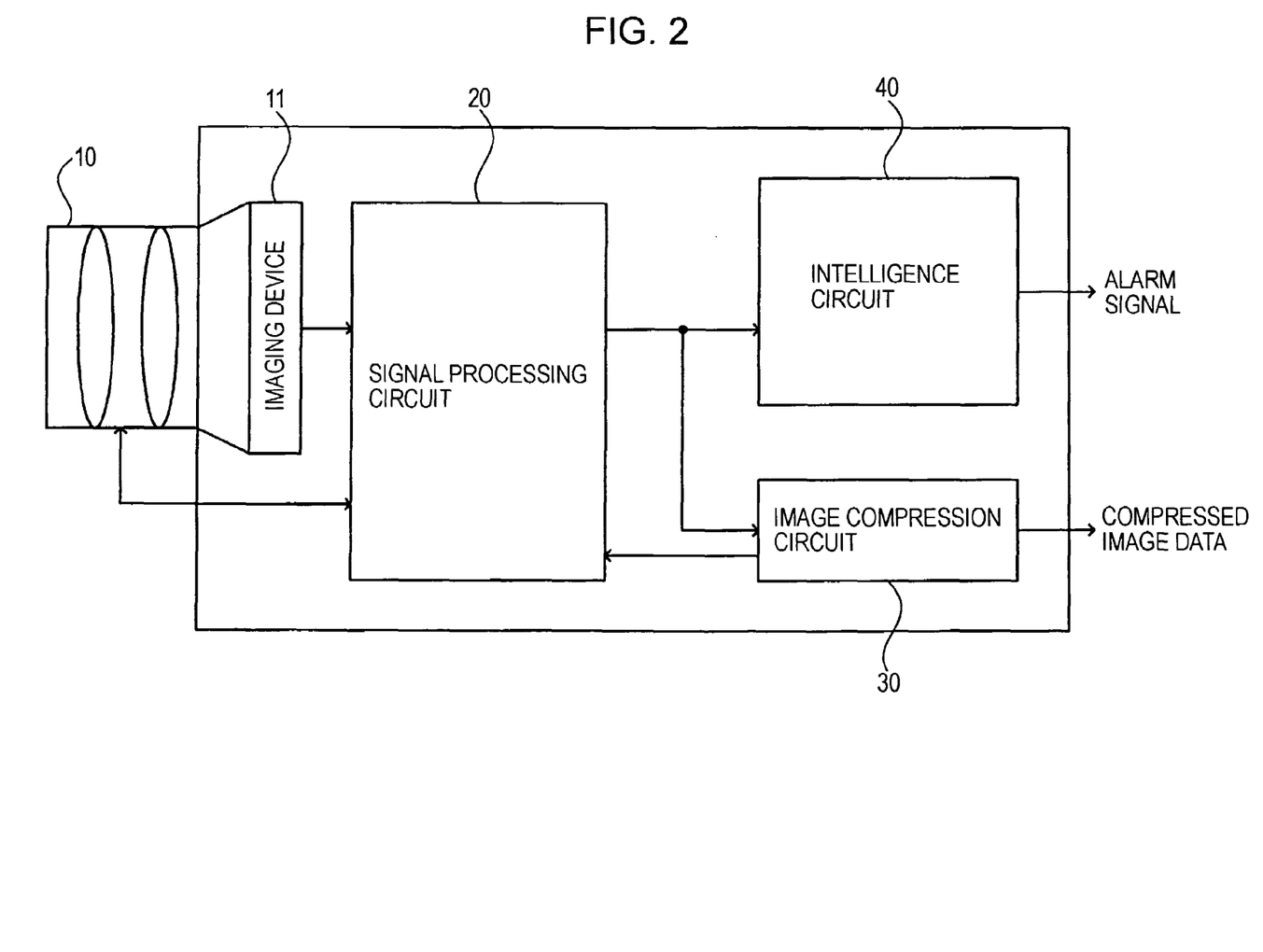
FIG. 2 is a block diagram illustrating the configuration of an imaging apparatus according to a second embodiment.

FIG. 2 is a block diagram illustrating the configuration of an imaging apparatus according to a second embodiment.

For the imaging apparatus according to the second embodiment, the circuit blocks corresponding to the imaging apparatus in FIG. 1 are marked with the same reference numerals, and the detailed description will be omitted. The different point of the imaging apparatus from the known apparatus shown in FIG. 9 is the point in which the compression information is fed back from the image compression circuit 30 to the signal processing circuit 20. The compression information includes, for example the file size of the image data after the compression.

When the amount of the compressed image data is greater than a predetermined amount (for example, the volume of transmission exceeds a network band) by such compressed information, the noise-elimination processing level for one frame is increased, and the compression efficiency increases by smoothing the high-frequency noise components. Thus, the volume of transmission can be controlled. Here, for example if the compression intensity is changed only by the image compression circuit 30 to control the volume of transmission, only the high-frequency components including the original image components are reduced. However, by using a noise reduction circuit, such as an ε filter described below, not only the high-frequency components, but also the low-frequency component noise is eliminated. Moreover, it is possible to selectively eliminate noise components from the signal components, and to maintain the image quality of the image data.

Third Embodiment

Figure 3:
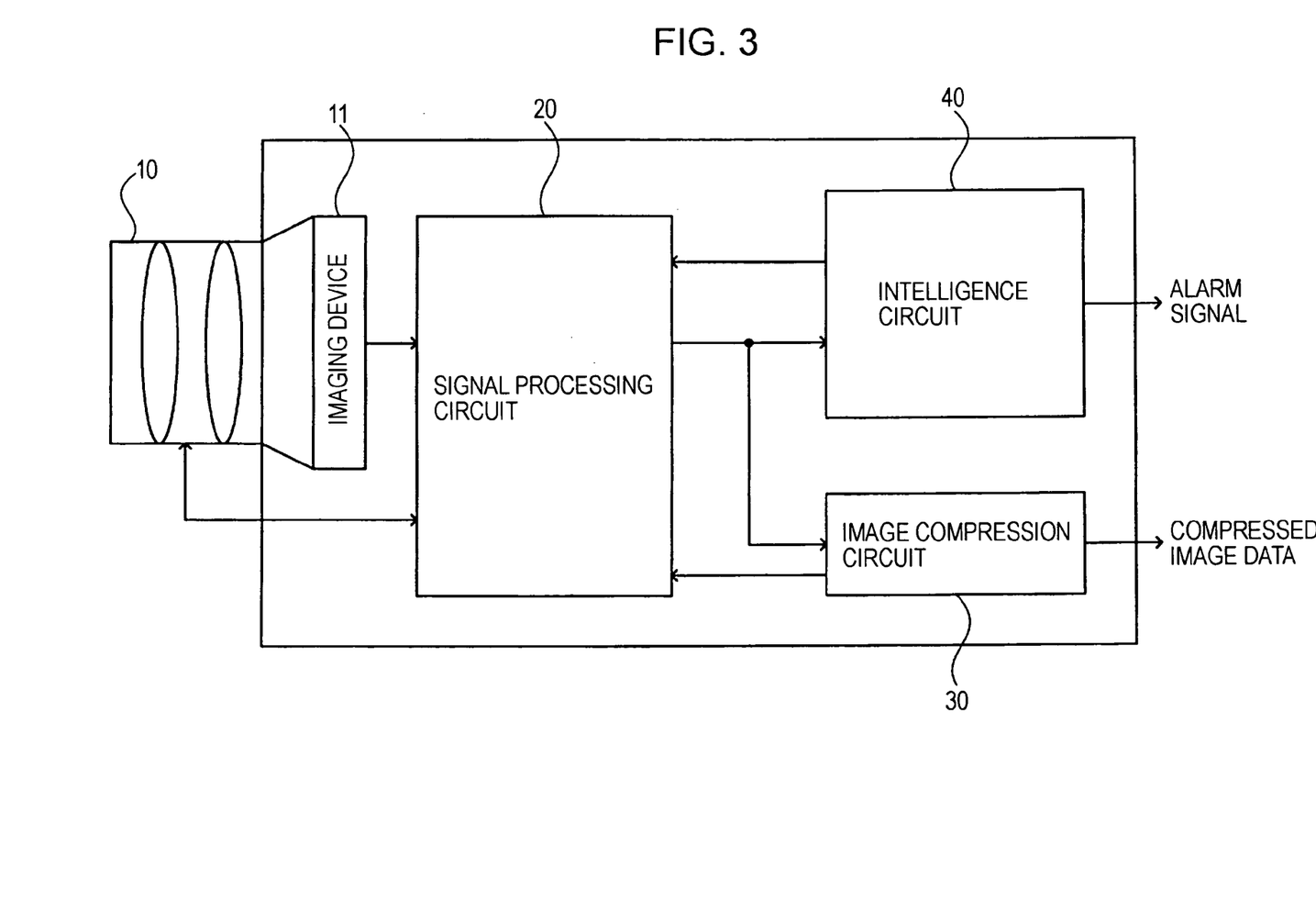
FIG. 3 is a block diagram (No. 1) illustrating the configuration of an imaging apparatus according to a third embodiment.
Figure 4:
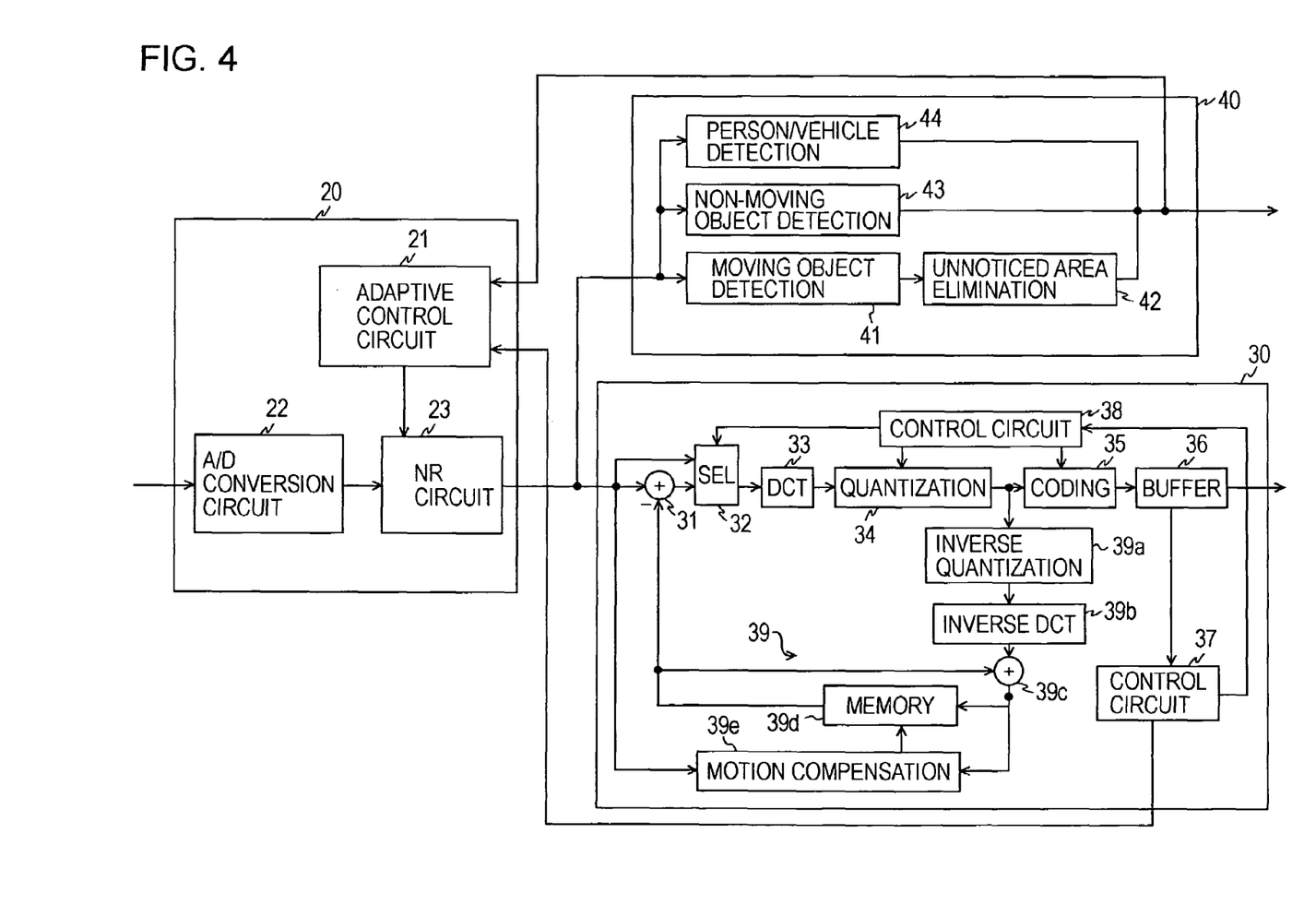
FIG. 4 is a block diagram (No. 2) illustrating the configuration of the imaging apparatus according to the third embodiment.

FIG. 3 and FIG. 4 are both block diagrams illustrating the configuration of an imaging apparatus according to a third embodiment.

The imaging apparatus of the third embodiment is constituted by the combination of the first embodiment and the second embodiment described above, and is characterized by the point in which the volume of recording and the volume of transmitting images can be further reduced without deteriorating the image quality of the detected important area.

In this regard, in the present embodiment, the output of the area specification information fed back from the intelligence circuit 40 to signal processing circuit 20 and the output of the compression information fed back from the image compression circuit 30 to the signal processing circuit 20 may be individually switched on/off. Here, the operation of when the output of the area specification information is switched off corresponds to the operation in the configuration shown in FIG. 2, and the operation of when the output of the compression information is switched off corresponds to the operation in the configuration shown in FIG. 1. Also, for example the operation of the intelligence circuit 40 itself may be changed into an off state. Alternatively, the specification enabling the user to easily select the installation/non-installation of the intelligence circuit 40 may be provided.

FIG. 4 illustrates a specific configuration of the signal processing circuit 20, the image compression circuit 30, and the intelligence circuit 40.

The signal processing circuit 20 includes an adaptive control circuit 21, an A/D conversion circuit 22, and a noise reduction (NR) circuit 23.

The adaptive control circuit 21 controls the noise-elimination intensity in the NR circuit 23 on the basis of the compression information fed back from the image compression circuit 30 and the area specification information fed back from the intelligence circuit 40. Here, the adaptive control circuit 21 changes the noise-elimination intensity in the entire image for one frame on the basis of the compression information and changes the noise-elimination intensity for each pixel in the image on the basis of the area specification information. That is to say, the adaptive control circuit 21 makes the noise-elimination intensity of the pixels in a noticed area based on the area specification information lower than that of the other area to increase the image quality of the noticed area. At the same time, the adaptive control circuit 21 offsets the noise-elimination intensity in the entire image so as to make the file size of the compressed image data determined from the compression information equal a constant size or less. Alternatively, the adaptive control circuit 21 may maintain the noise-elimination intensity in the noticed area at a low constant value, and may offset only the noise-elimination intensity in the other areas in accordance with the compression information.

The A/D conversion circuit 22 converts the analog image signal output from the imaging device 11 (FIG. 3) into digital image data, and outputs the data to the NR circuit 23.

The NR circuit 23 performs noise-elimination processing on the digital image data from the A/D conversion circuit 22 by the noise-elimination intensity specified for each pixel by the adaptive control circuit 21. The NR circuit 23 is a digital filter circuit having a function of spatial filtering for performing non-linear processing on two-dimensional image data. The NR circuit 23 receives threshold data θ as information specifying the noise-elimination intensity from the adaptive control circuit 21, and performs processing for eliminating the noise components included in the input image data in accordance with the threshold data θ. More specifically, for an example of the non-linear processing of the NR circuit 23, it is possible to selectively eliminate noise components while adaptively detecting edge areas using an ε filter as described below.

The image compression circuit 30 performs compression coding processing on the image data by the MPEG2 method, for example. In the image compression circuit 30, original image data from the signal processing circuit 20 is input into one of the input terminals of an adder circuit 31 and a selector 32. The adder circuit 31 calculates the difference between the original image data and the reference image data from a reference-frame generation circuit 39, and outputs the difference to the other of the input terminals of the selector 32. The output side of the selector 32 is provided with a DCT (Discrete Cosine Transform) circuit 33, a quantization circuit 34, a coding circuit 35, and a buffer circuit 36 in series, and the compressed image data is output from the buffer circuit 36.

A control circuit 37 is connected to the buffer circuit 36. The control circuit 37 outputs the file size of the compressed image data buffered in the buffer circuit 36 to a control circuit 38, and the adaptive control circuit 21 of the signal processing circuit 20 as the compression information. Here, the adaptive control circuit 21 controls the noise-elimination intensity for one frame with respect to the NR circuit 23 such that the file size of the output compressed image data becomes a certain size or less in accordance with the compression information from the control circuit 37. The control circuit 38 controls the operations of the selector 32, the quantization circuit 34, and the coding circuit 35 on the basis of the compression information from the control circuit 37, etc. In this regard, the control circuit 37 may be a circuit disposed at the outside of the image compression circuit 30, such as a system controller totally controlling the entire imaging apparatus, for example.

The reference-frame generation circuit 39 includes an inverse quantization circuit 39a, an inverse DCT circuit 39b, an adder circuit 39c, a frame memory 39d, and a motion compensation circuit 39e. Here, the motion compensation circuit 39e calculates a motion vector using the original image data from the signal processing circuit 20 and the image data of the previous frame restored by the adder circuit 39c. The frame memory 39d outputs the reference image data in accordance with the motion vector to the adder circuits 31 and 39c. The adder circuit 39c adds the reference image data from the frame memory 39d and the difference data restored by the inverse DCT circuit 39b to restore the image data, and supplies the image data to the frame memory 39d and the motion compensation circuit 39e.

The intelligence circuit 40 includes a moving-object detection circuit 41 for detecting a moving object having intruded into a monitored area of a monitoring camera, an unnoticed-area elimination circuit 42 for eliminating objects which are not necessary to be noticed, such as the shaking of the leaves of a tree or sprays from waves, etc., for example, from the detected moving objects, a non-moving object detection circuit 43 for detecting a non-moving object continuously kept as it is for a certain period of time in the monitored area of the monitoring camera, and a person/vehicle detection circuit 44 for detecting a specific object, such as a person, a vehicle, etc. The moving-object detection circuit 41, the non-moving object detection circuit 43, and the person/vehicle detection circuit 44 generates area specification information on each noticed area, and the information is fed back to the adaptive control circuit 21 of the signal processing circuit 20. In this regard, by disposing the unnoticed-area elimination circuit 42 in the imaging apparatus, it is possible to improve the detection performance compared with a known configuration in which this processing is performed by an external server on the basis of the compressed data transferred through a network.

Here, a description will be given of the information generated by the intelligence circuit 40. Here, as an example, a description will be given of moving-object detection data generated when a moving object is detected.

Figure 5:
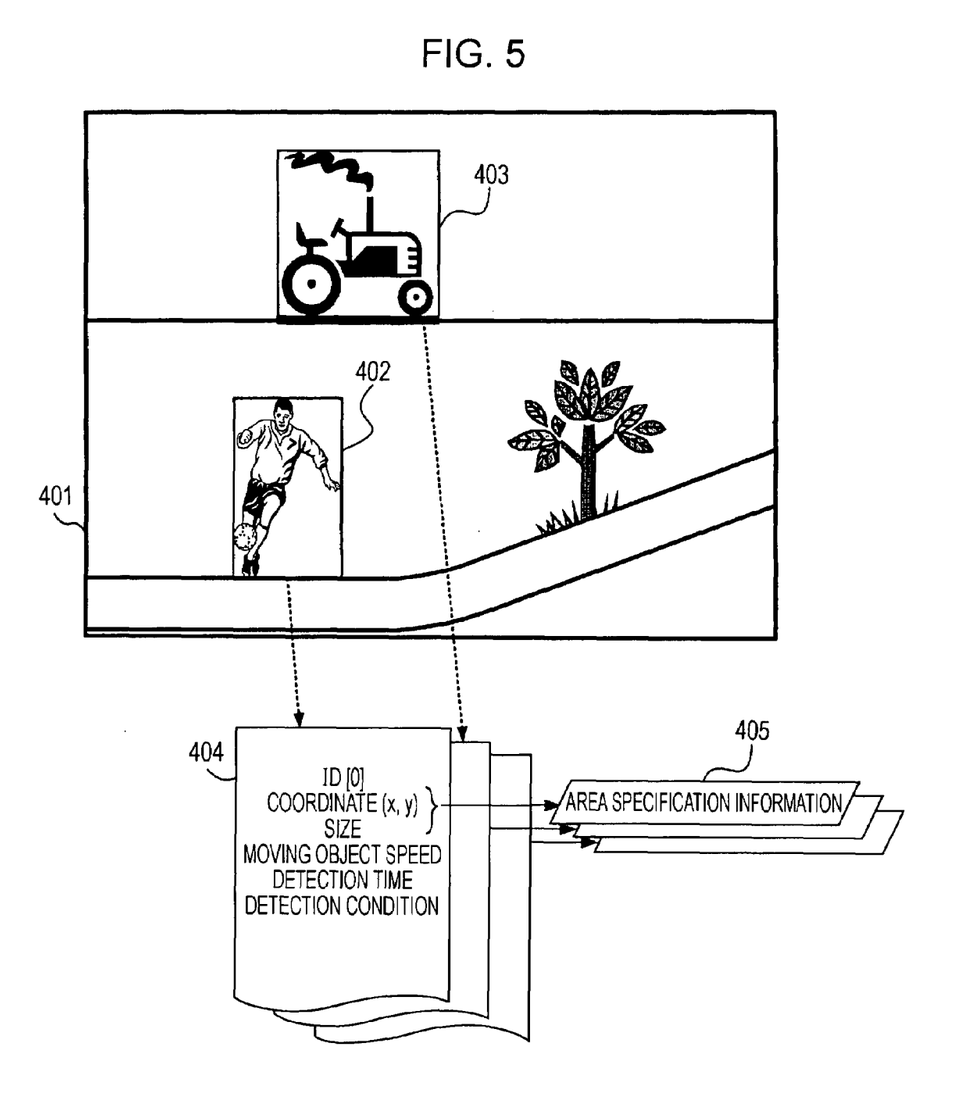
FIG. 5 is a diagram illustrating a relationship between a monitor image and the moving-object detection data.

FIG. 5 is a diagram illustrating a relationship between a monitor image and the moving-object detection data. In this regard, the monitor image means a reproduced image based on the image data input into the intelligence circuit 40.

Now, for example suppose that a person 402 and a vehicle 403 are individually captured as moving objects in a monitor image 401. In this case, the moving object detection data 404 is generated for each moving object detected from the monitor image 401. The moving object detection data 404 includes, for example an ID for identifying each moving object, position information indicating the position of each moving object in the monitor image 401, a moving object speed, detection time, a detection condition, etc. For the position information (for example, the image at a representative position, such as the upper left, and the size indicating the number of pixels from the representative position in the horizontal direction and in the vertical direction), for example the position information of a rectangular area in which a moving object exists in the monitor image 401 is created, and such position information is output to the adaptive control circuit 21 as the area specification information 405 specifying a noticed area.

In this regard, for the area specification information, an area including a detection object, such as a moving object, a non-moving object, etc., may be output by the coordinate information based on the outer shape of those objects rather than a rectangular area. In this case, in synchronous with the synchronization signal for scanning each pixel in a monitor image, the information indicating whether a noticed area or not for each pixel may be output in sequence.

Also, the monitor image may be divided into a plurality of detection areas, and the position information of the detection areas including a moving object and a non-moving object, etc., may be output as the area specification information. In this case, it is possible to improve the image quality of the image after compression by matching the size of the detection area and the size (for example, 8 pixels×8 pixels) of the DCT processing unit in the image compression circuit 30, and by controlling the noise-elimination intensity in the NR circuit 23 for each area of this size.

Next, a description will be specifically given of an example of the noise-elimination processing in the NR circuit 23. For an example of known noise-elimination processing, the processing, in which input image data is transformed into the frequency domain to eliminate high-frequency components, has been commonly performed. However, in such processing, high-frequency edges of the signal components are also smoothed along with noise components like an isolated point, and thus there has been a problem in that although the compression efficiency increases, the deterioration of the image quality is significant. In contrast, in the NR circuit 23 of the present embodiment, as described above, by using a spatial filter ($\epsilon$ filter) having non-linearity, noise components are selectively eliminated, and the image quality is improved together with the compression rate.

Figure 6:
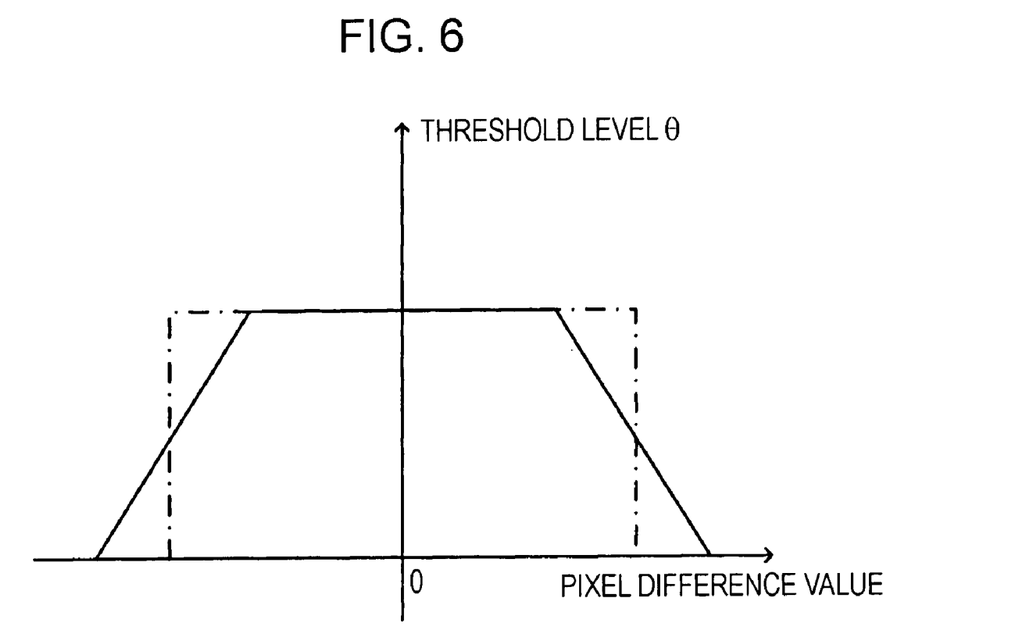
FIG. 6 is a diagram illustrating a threshold curve controlling the reduction level of a noise component.

FIG. 6 is a diagram illustrating a threshold curve controlling the reduction level of a noise component.

When the NR circuit 23 controls the noise-elimination intensity, the NR circuit 23 calculates the difference values between the noticed pixel data and a plurality of pixel data in the vicinity. If the difference value is not greater than a predetermined threshold value, the pixel value is added, whereas if the difference value is greater than a predetermined threshold value, the pixel value is not added. Thus, the pixel value of the pixel across an edge area is not added to the noticed pixel data, and is subjected to average processing. As a result, not only adaptive smoothing processing is performed on edges, but the smoothing processing effect for noise components is enhanced on the pixel data in an unimportant area by increasing the threshold value in the unnoticed area to which noise-elimination processing is strongly subjected. Thus, the compression rate can be increased.

However, with the setting of the rectangular threshold value shown in FIG. 6, the threshold value is high until a pixel difference value reaches a certain value, and the threshold value is low when the pixel difference value is equal to that value or more. In that case, intermittent processing is performed on a two-dimensional image, and at the time of performing moving image processing, blinking noise occurs on the image near the threshold value, or edge portions of an image does not become smooth. Thus, as indicated by a solid line in FIG. 6, the changing part of the threshold curve is changed gradually by a broken line (or may be a curve).

Figure 7:
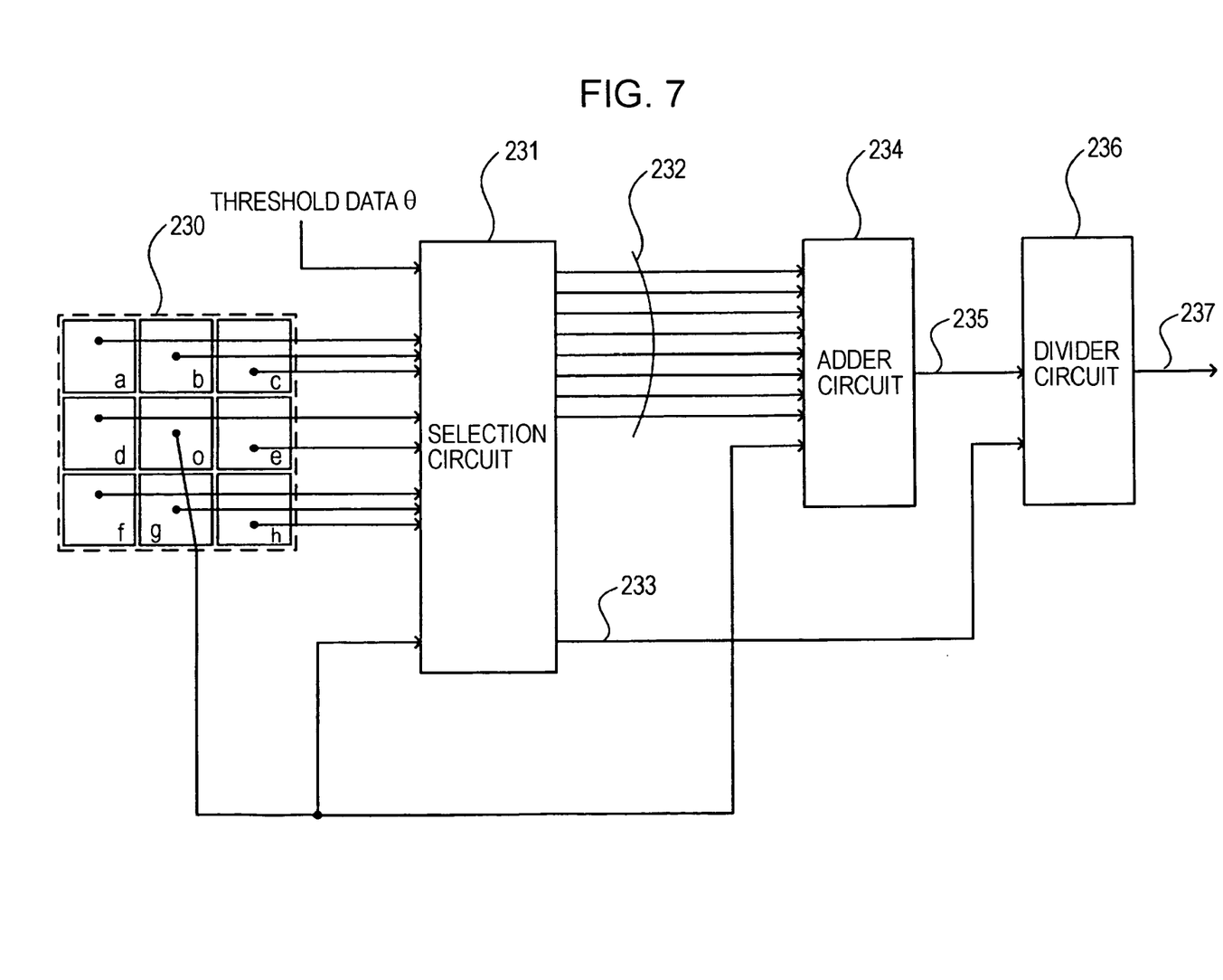
FIG. 7 is a block diagram illustrating an example of the circuit configuration of an filter.

Next, a description will be given of the circuit configuration of an ε filter to which the above-described threshold curve is applied. FIG. 7 is a block diagram illustrating an example of the circuit configuration of an E filter.

In FIG. 7, a figure 230 represents one area of a captured image including a notice pixel o and eight vicinity areas of the vicinity pixels a, b, c, d, e, f, g, and h. However, these pixels are all the pixels corresponding to the color filters of the same color. When the level values of these pixel data are substituted by the same notation with codes a to h and o, the level values a to h of these vicinity pixels are supplied to a selection circuit 231. The value of the threshold data θ in accordance with the above-described threshold curve and the level value o of the noticed pixel are input into the selection circuit 231.

In the selection circuit 231, first, the difference value (|a−o|) between the level value a of the vicinity pixel a and the level value o of the noticed pixel o is calculated, and this difference value and the threshold data θ are compared. If the above-described difference value is less than the value of the threshold data θ, the level value a is output at the output port 232. Also, if the difference value is greater than the threshold data θ, the level value a is not output, but the value "0" is output at the output port 232. Furthermore, the same calculation is performed for the level values b to h of the other vicinity pixels b to h.

Accordingly, the selection circuit 231 is provided with the same number of, for example, eight output ports 232 as the number of vicinity pixels. If the above-described difference values are less than the value of the threshold data θ individually, the level values a to h are output at the output port 232. Also, if the difference values are greater than the threshold data θ, the value "0" is output at the output port 232. Also, the selection circuit 231 is provided with the output port 233, the sum of the number of output ports 232, at which the above-described level values a to h are output and 1 is output, at the output port 233.

The output from the output port 232 of the selection circuit 231 and the level value o of the noticed pixel o are supplied to an adder circuit 234, and the value output at the output port 235 of the adder circuit 234 is supplied to a divider circuit 236. Also, the value of the output port 233 of the above-described selection circuit 231 is supplied to the divider circuit 236. In the divider circuit 236, the value of the output port 235 of the adder circuit 234 is divided by the value of the output port 233 of the selection circuit 231, and the value of the calculation result is output from an output port 237.

By this means, when the output port 237 is set to a certain threshold value θ, if the levels of the vicinity pixels are in the range of the notice pixel level ±θ, the vicinity pixels are included in the average processing elements. If the levels of the vicinity pixels are not in the range of the notice pixel level ±θ, the vicinity pixels are not included in the average processing elements. After a search is conducted on all the vicinity pixels whether to be included in the average processing elements, only the vicinity pixels included in the average processing elements are targeted for calculation, and a new value of the noticed pixel, which have been calculated by the average calculation with the noticed pixel is output.

Accordingly, when an image edge is in a search area, if the level of a pixel constituting the edge is outside the range of the notice pixel level ±θ, the pixel is not to be the target of the average calculation. Thus, for example the image does not become dull by the pixels constituting an edge being included in the average processing. That is to say, if the NR circuit 23 is constituted by an ε filter, it is possible to suppress only noise components while keeping the image edge as it is by selecting the value of the threshold data θ appropriately.

Next, a description will be given of the configuration for achieving the imaging apparatus having the above-described functions as an IP camera (also referred to as a network camera).

Figure 8:
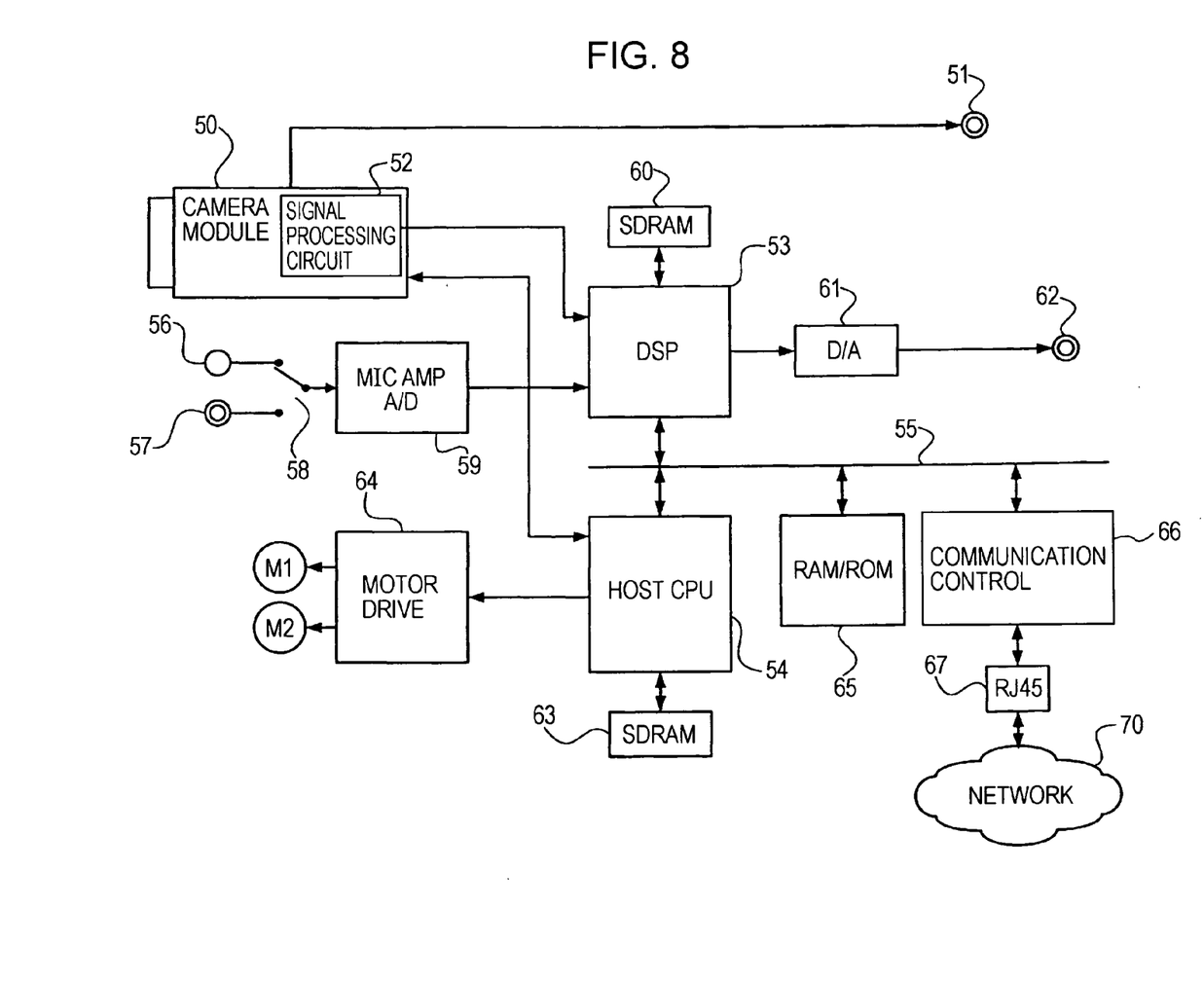
FIG. 8 is a block diagram illustrating the entire configuration of an IP camera.

FIG. 8 is a block diagram illustrating the entire configuration of an IP camera.

A camera module 50 includes a lens, which is an essential part of the IP camera, a solid-state imaging device, such as a CCD, etc., a signal processing circuit, etc. An analog-composite video signal, which has captured an image of a predetermined monitor area is sent from the imaging device of the camera module 50 to a video monitor terminal 51. Also, a signal processing circuit 52 in the camera module 50 is a circuit for performing various kinds of signal processing, such as A/D conversion processing of the image signal from the imaging device, noise-elimination processing on the image data after digital conversion, etc., and corresponds to the functions of the signal processing circuit 20 shown in FIGS. 1 to 3. The image data from the signal processing circuit 52 is output, for example to a DSP (Digital Signal Processor) 53 as digital image data conforming to BT-656, for example.

A description will be omitted of the detailed configuration of the DSP 53. The DSP 53 has mainly two functions. The first function is a function of converting the digital image data into the video data of a predetermined coding method. The video data coded by the DSP 53 is sent to and received from a host CPU (Central Processing Unit) 54 through a local bus 55. Also, the DSP 53 has a function of simultaneously performing an object detection processing, such as a moving object detection, a non-moving object detection, and a person/vehicle detection, etc. Thus, the DSP 53 can simultaneously pass the detection results on objects, such as a moving object, a non-moving object, etc., in the monitor area of the IP camera to the host CPU 54.

Here, each function of the image compression circuit 30 and intelligence circuit 40 shown in FIGS. 1 to 3 is achieved by the DSP 53. In this case, the compression information and the area specification information are, for example transmitted to the signal processing circuit 52 in the camera module 50 through the host CPU 54.

Also, the IP camera includes an audio terminal 56 for receiving sound from an internal microphone, and an external audio terminal 57 to which an external microphone is connected. The two terminals 56 and 57 can be connected to an audio input circuit 59 through a changeover switch 58. The audio input circuit 59 amplifies an analog audio signal, converts the signal into a digital signal, and supplies the signal to the DSP 53.

Also, an SDRAM (Synchronous Dynamic Random Access Memory) 60 and a D/A converter 61 are connected to the DSP 53. The SDRAM 60 is used for a working area of the DSP 53. The D/A converter 61 is connected to a monitor terminal 62 of the audio data, and outputs the audio signal corresponding to the captured video from the monitor terminal 62.

The host CPU 54 is connected to the camera module 50, an SDRAM 63, and a motor drive circuit 64. The SDRAM 63 stores coded video data as necessary. The host CPU 54 generates stream data and data files using the video data in the SDRAM 63 on the basis of the detection results of moving objects and non-moving objects, etc., by the DSP 53, and sends them to a network 70 through a communication controller 66. Also, the host CPU 54 can send data of the specified coding method to the network in accordance with the control signal received through the network 70.

Furthermore, the host CPU 54 can drive a pan motor M1 and a tilt motor M2 by the motor drive circuit 64. That is to say, the host CPU 54 can control the camera module 50. For example, the host CPU 54 can control the camera module 50 in accordance with the detection results on a moving object, a non-moving object, etc., in a monitor area, or can adjust the zoom ratio of the lens mechanism thereof.

A local memory 65 including a ROM (Read Only Memory) and a RAM (Random Access Memory), and a communication controller 66 are connected to the host CPU 54 through a local bus 55. The local memory 65 includes an AV buffer for storing coded video data and audio data, and a program memory for storing programs, such as an event manager, etc.

The communication controller 66 includes a connection terminal 67 to the network 70, such as an RJ45, etc., and is capable of network delivering the stream data and the data files generated by the host CPU 54 to client monitoring terminals.

By the IP camera having the above-described configuration, it is possible to transmit the compressed image data captured from a monitor area to an external server through the network 70 together with object detection results of a moving object, a non-moving object, etc. The server can perform the operations, for example, receiving compressed image data, etc., from a plurality of IP cameras having the above-described configuration and connected to the network 70, saving the received data onto a recording medium, displaying the playback image on the monitor, controlling the operations of the IP camera on the basis of the object detection results, and so on. Also, since object detection processing is carried out by each IP camera, the processing load on the server is reduced.

In such a monitoring camera system, by the control function of the above-described noise-elimination processing in each IP camera, the compressed image data to be output is maintained at a certain amount of less. It is therefore possible to improve the image quality of at least necessary area of the monitor image while reducing the volume of transmission in the network 70 and the capacity of recording medium on the server.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus for capturing an image using a solid-state imaging device, the imaging apparatus comprising:
   a noise-elimination processing section capable of performing noise elimination processing on the captured image data by applying an individual noise-elimination intensity for each pixel;
   an image coding processing section compression coding the image data having been subjected to the noise-elimination processing;
   an image analyzing section analyzing the image data having been subjected to the noise-elimination processing and generating area specification information identifying a noticed area in the captured image; and
   a noise-elimination processing control section controlling the noise-elimination processing section so as to make the noise-elimination intensity for the noticed area in the captured image lower than the noise-elimination intensity for the other area on the basis of the area specification information from the image analyzing section.

2. The imaging apparatus according to claim 1,
   wherein when the image analyzing section detects an object having a specific quality in the captured image, the image analyzing section outputs information identifying a position of the object as the area specification information.

3. The imaging apparatus according to claim 2,
   wherein the image analyzing section detects a moving object as the object.

4. The imaging apparatus according to claim 2,
   wherein the image analyzing section detects a non-moving object as the object.

5. The imaging apparatus according to claim 1,
   wherein the noise-elimination processing control section further controls the noise-elimination intensity such that the amount of data of the compressed image data generated by the image coding processing section is a certain amount or less.

6. The imaging apparatus according to claim 5,
   wherein the noise-elimination processing control section offsets the noise-elimination intensity for the entire captured image in accordance with the amount of data of the compressed image data.

7. The imaging apparatus according to claim 5,
   wherein the noise-elimination processing control section changes the noise-elimination intensity for the area other than the noticed area in accordance with the amount of data of the compressed image data.

8. The imaging apparatus according to claim 1,
   wherein the noise-elimination processing section includes a spatial filter having non-linearity.

9. The imaging apparatus according to claim 8,
   wherein the noise-elimination processing section includes an $\epsilon$ filter as the spatial filter.

10. The imaging apparatus according to claim 1, further comprising a communication control section adding information based on an image analysis result by the image analyzing section to the compressed image data generated by the image coding processing section, and transmitting the data to an external server through a network.

11. A method of processing an image in an imaging apparatus using a solid-state imaging device, the method comprising the steps of:
    a noise-elimination processing section performing noise elimination processing on captured image data by applying an individual noise-elimination intensity for each pixel;
    an image coding processing section compression coding the image data having been subjected to the noise-elimination processing;
    an image analyzing section analyzing the image data having been subjected to the noise-elimination processing and generating area specification information identifying a noticed area in the captured image; and
    a noise-elimination processing control section controlling the noise-elimination processing section so as to make the noise-elimination intensity for the noticed area in the captured image lower than the noise-elimination intensity for the other area on the basis of the area specification information from the image analyzing section.

* * * * *